United States Patent
Michl et al.

(10) Patent No.: US 7,851,542 B2
(45) Date of Patent: Dec. 14, 2010

(54) USE OF AN AQUEOUS BINDING AGENT DEVOID OF FORMALDEHYDE FOR SUBSTRATES

(75) Inventors: Kathrin Michl, Ludwigshafen (DE); Matthias Gerst, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 484 days.

(21) Appl. No.: 10/571,699

(22) PCT Filed: Sep. 9, 2004

(86) PCT No.: PCT/EP2004/010056

§ 371 (c)(1),
(2), (4) Date: Mar. 13, 2006

(87) PCT Pub. No.: WO2005/026433

PCT Pub. Date: Mar. 24, 2005

(65) Prior Publication Data

US 2007/0027281 A1 Feb. 1, 2007

(30) Foreign Application Priority Data

Sep. 15, 2003 (DE) ................ 103 42 858

(51) Int. Cl.
*C08L 33/00* (2006.01)
*B05D 7/00* (2006.01)
(52) U.S. Cl. ...................... 524/523; 524/522
(58) Field of Classification Search .............. 524/522, 524/523
See application file for complete search history.

(56) References Cited

U.S. PATENT DOCUMENTS

| | | | |
|---|---|---|---|
| 5,530,079 A * | 6/1996 | Veregin et al. ........... 526/219.3 |
| 5,536,766 A * | 7/1996 | Seyffer et al. ................ 524/100 |
| 5,667,848 A | 9/1997 | Wuestefeld et al. |
| 5,932,665 A | 8/1999 | DePorter et al. |
| 6,071,994 A * | 6/2000 | Hummerich et al. ......... 524/247 |
| 6,114,464 A * | 9/2000 | Reck et al. ................ 525/329.5 |
| 6,221,973 B1 | 4/2001 | Arkens et al. |
| 6,596,386 B1 * | 7/2003 | Reck et al. ................ 428/292.4 |

FOREIGN PATENT DOCUMENTS

| | | |
|---|---|---|
| EP | 0 583 086 | 2/1994 |
| EP | 0 591 821 | 4/1994 |
| EP | 0 882 074 | 12/1998 |
| EP | 0 990 727 | 4/2000 |
| WO | 94/08085 | 4/1994 |

\* cited by examiner

*Primary Examiner*—Vasu Jagannathan
*Assistant Examiner*—Karuna P Reddy
(74) *Attorney, Agent, or Firm*—Oblon, Spivak, McClelland, Maier & Neustadt, L.L.P.

(57) ABSTRACT

The present invention relates to formaldehyde-free aqueous binders for substrates, having a broad molecular weight distribution and comprising
(A) from 0 to 100% by weight of an ethylenically unsaturated acid anhydride or ethylenically unsaturated dicarboxylic acid whose carboxylic acid groups can form an anhydride group, or mixtures thereof,
(B) from 100 to 0% by weight of an ethylenically unsaturated compound,
(C) at least one polyfunctional crosslinker or mixtures thereof,
the polymers of A) and B) obtained by free-radical addition polymerization, when classified in a coordinate system by way of their average molecular weight Mw and their polydispersity, being situated in the area above a straight line which is defined by the linear equation y=1.25x+20 000 and has been shifted in y direction parallelwise by at least +3 000, the x axis denoting the weight-average molecular weight and the y axis the polydispersity times 10 000.

29 Claims, No Drawings

USE OF AN AQUEOUS BINDING AGENT DEVOID OF FORMALDEHYDE FOR SUBSTRATES

BACKGROUND OF THE INVENTION

1. Field of the Invention

The present invention relates to the use of formaldehyde-free aqueous binders having a broad molecular weight distribution for substrates, said binders comprising (A) from 0 to 100% by weight of an ethylenically unsaturated acid anhydride or ethylenically unsaturated dicarboxylic acid whose carboxylic acid groups can form an anhydride group, or mixtures thereof, (B) from 100 to 0% by weight of an ethylenically unsaturated compound, (C) at least one polyfunctional crosslinker or mixtures thereof, the polymers of A) and B) obtained by free-radical addition polymerization, when classified in a coordinate system by way of their average molecular weight Mw and their polydispersity, being situated in the area above a straight line which is defined by the linear equation y=1.25x+20 000 and has been shifted in y direction parallelwise by at least +3 000, the x axis denoting the weight-average molecular weight and the y axis the polydispersity times 10 000.

2. Description of the Background

The invention further relates to the binders themselves and also to their use for moldings, mats or boards, for example, in particular for fibrous and particulate substrates such as fiber webs, glass fibers, rockwool, reclaimed cotton, natural fibers or synthetic fibers.

The consolidation of sheetlike fibrous structures, or fiber webs, is effected, for example, purely mechanically by needling or water jet consolidation of a wet-laid or air-laid web or by chemical consolidation of the webs with a polymeric binder. The binder is generally applied by impregnating, spraying or coating. To enhance the wet strength and heat resistance of the webs use is frequently made of binders comprising crosslinkers which give off formaldehyde. Alternatives to existing binders are sought by the skilled worker in order to avoid formaldehyde emissions.

U.S. Pat. No. 6,221,973 discloses a formaldehyde-free, crosslinkable aqueous composition comprising a polyacid, a polyol, and a phosphorus-containing reaction accelerant for use as binders for heat-resistant nonwovens, e.g., glass fibers.

EP 990 727 discloses binders for mineral fibers, comprising a low molecular mass polycarboxy polymer and a polyol, the pH of the binder being not greater than 3.5.

U.S. Pat. No. 5,932,665 discloses binders based on polycarboxy polymer, this system being curable at lower temperatures than in the case of comparable systems composed of homopolyacrylic acids, by setting of the molecular weight and of the copolymer composition.

EP 882 074 describes formaldehyde-free aqueous binders comprising an ethylenically unsaturated acid anhydride or an ethylenically unsaturated dicarboxylic acid and an alkanolamine as coating materials, impregnants and binders for fiber webs.

The binders described to date in the state of the art use either low or high molecular mass polycarboxylic acids, i.e., polycarboxylic acids having a molecular weight distribution which is typical of free-radical addition polymerizations. Substrates produced using high molecular mass binders have a high strength, a quality determined by means, for example, of tensile strength measurements. Low molecular mass binders based on polycarboxylic acid are distributed effectively on the substrates, since they possess high fluidities (as measured by dynamic mechanical analysis, determination of the dynamic storage modulus G'), but have deficiencies in the resulting strength properties.

SUMMARY OF THE INVENTION

It is an object of the present invention to provide binders for use for substrates such as moldings, mats, or boards, said binders combining high strengths with high fluidity.

We have found that this object is achieved by the use of formaldehyde-free aqueous binders having a broad molecular weight distribution and comprising (A) from 0 to 100% by weight of an ethylenically unsaturated acid anhydride or ethylenically unsaturated dicarboxylic acid whose carboxylic acid groups can form an anhydride group, or mixtures thereof, (B) from 100 to 0% by weight of an ethylenically unsaturated compound, (C) at least one polyfunctional crosslinker or mixtures thereof, the polymers of A) and B) obtained by free-radical addition polymerization, when classified in a coordinate system by way of their average molecular weight M, and their polydispersity, being situated in the area above a straight line which is defined by the linear equation y=1.25x+20 000 and has been shifted in y direction parallelwise by at least +3 000, the x axis denoting the weight-average molecular weight and the y axis the polydispersity times 10 000.

DETAILED DESCRIPTION OF THE PREFERRED EMBODIMENTS

When the polycarboxylic acids of the invention with broad molecular weight distribution are used, the high molecular mass fractions of the binder ensure high strength in the substrates while the low molecular mass fractions at the same time guarantee high fluidity of the binder on the substrate.

The aqueous binder of the invention includes a polymer A) containing from 0 to 100% by weight, preferably from 5 to 50% by weight, more preferably from 10 to 40% by weight of units of an ethylenically unsaturated acid anhydride or an ethylenically unsaturated dicarboxylic acid whose carboxylic groups can form an anhydride group.

Preferred acid anhydrides are dicarboxylic anhydrides. Suitable ethylenically unsaturated dicarboxylic acids are generally those having carboxylic acid groups on adjacent carbon atoms.

The carboxylic acids can also be present in the form of their salts.

Preferred monomers A) are maleic acid, fumaric acid, maleic anhydride, itaconic acid, 1,2,3,6-tetrahydrophthalic acid, 1,2,3,6-tetrahydrophthalic anhydride, their alkali metal salts and ammonium salts or mixtures thereof. Particular preference is given to maleic acid and maleic anhydride.

Monomers B) which can be used include for example the following:

monoethylenically unsaturated $C_3$ to $C_{10}$ monocarboxylic acids (monomers $b_1$), such as acrylic acid, methacrylic acid, ethylacrylic acid, allylacetic acid, crotonic acid, vinylacetic acid, maleic monoesters such as monomethyl maleate, their mixtures and their alkali metal salts and ammonium salts;

linear 1-olefins, branched-chain 1-olefins or cyclic olefins (monomers $b_2$), such as ethene, propene, butene, isobutene, pentene, cyclopentene, hexene, cyclohexene, octene, 2,4,4-trimethyl-1-pentene alone or mixed with 2,4,4-trimethyl-2-pentene, $C_8$-$C_{10}$ olefin, 1-dodecene, $C_{12}$-$C_{14}$ olefin, octadecene, 1-eicosene ($C_{20}$), $C_{20}$-$C_{24}$ olefin; oligoolefins prepared by metallocene catalysis and having a terminal double bond, such as oligopropene, oligohexene and oligooctadecene; and olefins prepared by cationic polymerization and having a high α-olefin fraction, such as polyisobutene;

vinyl and allyl alkyl ethers having 1 to 40 carbon atoms in the alkyl radical, it being possible for the alkyl radical to carry further substituents such as a hydroxyl group, an amino or dialkylamino group or one or more alkoxylate groups (monomers $b_3$), such as methyl vinyl ether, ethyl vinyl ether, propyl vinyl ether, isobutyl vinyl ether, 2-ethylhexyl vinyl ether, vinyl cyclohexyl ether, vinyl-4-hydroxybutyl ether, decyl vinyl ether, dodecyl vinyl ether, octadecyl vinyl ether, 2-(diethylamino)ethyl vinyl ether, 2-(di-n-butyl-amino)ethyl vinyl ether, methyl diglycol vinyl ether, and the corresponding allyl ethers and mixtures thereof;

acrylamides and alkyl-substituted acrylamides (monomers $b_4$), such as acrylamide, methacrylamide, N-tert-butylacrylamide, and N-methyl(meth)acrylamide;

monomers containing sulfo groups (monomers $b_5$), such as allylsulfonic acid, methallylsulfonic acid, styrenesulfonate, vinylsulfonic acid, allyloxybenzenesulfonic acid, 2-acrylamido-2-methylpropanesulfonic acid, their corresponding alkali metal salts or ammonium salts, or mixtures thereof;

$C_1$ to $C_8$ alkyl esters or $C_1$ to $C_4$ hydroxyalkyl esters of acrylic acid, methacrylic acid or maleic acid, or acrylic, methacrylic or maleic esters of $C_1$ to $C_{18}$ alcohols alkoxylated with from 2 to 50 mol of ethylene oxide, propylene oxide, butylene oxide or mixtures thereof (monomers $b_6$), such as methyl(meth)acrylate, ethyl(meth)acrylate, propyl(meth)acrylate, isopropyl(meth)acrylate, butyl(meth)acrylate, hexyl(meth)acrylate, 2-ethylhexyl(meth)acrylate, hydroxyethyl(meth)acrylate, hydroxypropyl(meth)acrylate, butane-1,4-diol monoacrylate, dibutyl maleate, ethyl diglycol acrylate, methyl polyglycol acrylate (11 EO), (meth)acrylic esters of $C_{13}$/$C_{15}$ oxo alcohol reacted with 3, 5, 7, 10 or 30 mol of ethylene oxide, or mixtures thereof;

alkylaminoalkyl(meth)acrylates or alkylaminoalkyl(meth)acrylamides or quaternization products thereof (monomers $b_7$), such as 2-(N,N-dimethylamino)ethyl(meth)acrylate, 3-(N,N-dimethylamino)propyl(meth)acrylate, 2-(N,N,N-trimethylammonio)ethyl(meth)acrylate chloride, 2-dimethylaminoethyl(meth)acrylamide, 3-dimethylaminopropyl(meth)acrylamide, and 3-trimethylammoniopropyl-(meth)acrylamide chloride;

vinyl and allyl esters of $C_1$ to $C_{30}$ monocarboxylic acids (monomers $b_8$), such as vinyl formate, vinyl acetate, vinyl propionate, vinyl butyrate, vinyl valerate, vinyl 2-ethylhexanoate, vinyl nonoate, vinyl decanoate, vinyl pivalate, vinyl palmitate, vinyl stearate, and vinyl laurate.

Further possible monomers $b_9$ include the following:

N-vinylformamide, N-vinyl-N-methylformamide, styrene, α-methylstyrene, 3-methylstyrene, butadiene, N-vinylpyrrolidone, N-vinylimidazole, 1-vinyl-2-methylimidazole, 1-vinyl-2-methylimidazoline, N-vinylcaprolactam, acrylonitrile, methacrylonitrile, allyl alcohol, 2-vinylpyridine, 4-vinylpyridine, diallyidimethylammonium chloride, vinylidene chloride, vinyl chloride, acrolein, methacrolein, and vinylcarbazole and mixtures thereof.

As well as monomers A), the polymer preferably additionally contains monomers (B) in amounts of from 50 to 95%, more preferably from 60 to 90%, by weight.

Preferred monomers are acrylic acid, methacrylic acid, esters of acrylic or methacrylic acid (e.g., methyl(meth)acrylate, ethyl(meth)acrylate, butyl(meth)acrylate), ethene, propene, butene, isobutene, cyclopentene, methyl vinyl ether, ethyl vinyl ether, acrylamide, 2-acrylamido-2-methylpropanesulfonic acid, vinyl acetate, styrene, butadiene, acrylonitrile, monomethyl maleate or mixtures thereof.

Particular preference is given to acrylic acid, methacrylic acid, methyl(meth)acrylate, ethyl(meth)acrylate, butyl(meth)acrylate, ethene, acrylamide, styrene and acrylonitrile, monomethyl maleate or mixtures thereof.

Very particular preference is given to acrylic acid, methacrylic acid and methyl(meth)acrylate, ethyl(meth)acrylate, butyl(meth)acrylate, monomethyl maleate or mixtures thereof.

The polymers can be prepared according to customary polymerization processes, for example by bulk, emulsion, suspension, dispersion, precipitation or solution polymerization. The polymerization processes stated are preferably operated in the absence of oxygen, preferably in a stream of nitrogen. For all polymerization methods the customary apparatus is used, examples being stirred tanks, stirred tank cascades, autoclaves, tube reactors, and compounders. It is preferred to operate in accordance with the method of solution, emulsion, precipitation or suspension polymerization. The methods of solution polymerization and of emulsion polymerization are particularly preferred. The polymerization can be performed in solvents or diluents, such as toluene, o-xylene, p-xylene, cumene, chlorobenzene, ethylbenzene, technical-grade mixtures of alkyl aromatics, cyclohexane, technical-grade aliphatics mixtures, acetone, cyclohexanone, tetrahydrofuran, dioxane, glycols and glycol derivatives, polyalkylene glycols and derivatives thereof, diethyl ether, tert-butyl methyl ether, methyl acetate, isopropanol, ethanol, water or mixtures such as, for example isopropanol/water mixtures. The preferred solvent or diluent is water with or without fractions of up to 60% by weight of alcohols or glycols. The use of water is particularly preferred.

The polymerization can be conducted at temperatures from 20 to 300° C., preferably from 60 to 200° C. Depending on the choice of polymerization conditions it is possible to obtain weight-average molecular weights of, for example, from 800 to 5 000 000, in particular from 1 000 to 1 000 000. The weight-average molecular weights $M_w$ are preferably above 3 000. Weight-average molecular weights of from 3 000 to 600 000 are particularly preferred. $M_w$ is determined by gel permeation chromatography (detailed description in Examples).

The polymers containing the monomers A) and B), when classified in a coordinate system by way of their average molecular weight $M_w$ and their polydispersity, are situated in the area above a straight line which is defined by the linear equation y=1.25x+20 000 and has been shifted in the y direction parallelwise by +5 000, the x axis denoting the weight-average molecular weight and the y axis the polydispersity times 10 000.

The polymerization is preferably conducted in the presence of compounds which form free radicals. These compounds are required in amounts of up to 30%, preferably from 0.05 to 15%, more preferably from 0.2 to 8% by weight, based on the monomers used in the polymerization. In the case of multicomponent initiator systems (redox initiator systems, for example) the above weight figures are based on the sum total of the components.

Examples of suitable polymerization initiators include peroxides, hydroperoxides, peroxodisulfates, percarbonates, peroxy esters, hydrogen peroxide, and azo compounds. Examples of initiators, which may be water-soluble or else water-insoluble, are hydrogen peroxide, dibenzoyl peroxide, dicyclohexyl peroxodicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, lithium, sodium, potassium and ammonium peroxodisulfate, azodiisobutyronitrile, 2,2'-azobis(2-amidinopropane)dihydrochloride, 2-(carbamoylazo)isobutyronitrile and 4,4-azobis(4-cyanovaleric acid).

The initiators can be employed alone or in a mixture with one another, examples being mixtures of hydrogen peroxide and sodium peroxodisulfate. For polymerization in an aqueous medium it is preferred to use water-soluble initiators.

It is equally possible to use the known redox initiator systems as polymerization initiators. Such redox initiator systems include at least one peroxide compound in combination with a redox coinitiator, examples being reducing sulfur compounds, such as bisulfites, sulfites, thiosulfates, dithionites and tetrathionates of alkali metals and ammonium compounds. For instance, combinations of peroxodisulfates with alkali metal or ammonium hydrogensulfites can be used, e.g., ammonium peroxodisulfate and ammonium disulfite. The amount of the peroxide compound relative to the redox coinitiator is from 30:1 to 0.05:1.

In combination with the initiators or redox initiator systems it is possible in addition to use transition metal catalysts, examples being salts of iron, cobalt, nickel, copper, vanadium, and manganese. Examples of suitable salts include iron(II) sulfate, cobalt(II) chloride, nickel(II) sulfate, and copper(I) chloride. Based on monomers, the reducing transition metal salt is used at a concentration of from 0.1 to 1 000 ppm. For instance, combinations of hydrogen peroxide with iron(II) salts can be used, such as from 0.5 to 30% of hydrogen peroxide and from 0.1 to 500 ppm of Mohr's salt.

Polymerization in organic solvents, too, can be carried out using redox coinitiators and/or transition metal catalysts in combination with the abovementioned initiators, examples of such coinitiators and/or catalysts being benzoin, dimethylaniline, ascorbic acid, and organic-solvent-soluble complexes of heavy metals such as copper, cobalt, iron, manganese, nickel, and chromium. The amounts of redox coinitiators or transition metal catalysts normally used here are customarily from about 0.1 to 1 000 ppm, based on the amounts of monomers used.

If the polymerization of the reaction mixture is started at the lower limit of the suitable temperature range for the polymerization and subsequently completed at a higher temperature then it is advantageous to use at least two different initiators which decompose at different temperatures, so that a sufficient concentration of free radicals is available within each temperature interval.

The initiator can also be added in stages, or the rate of initiator addition can be varied over time.

To prepare polymers having a low average molecular weight it is frequently advantageous to conduct the copolymerization in the presence of regulators. For this purpose it is possible to use customary regulators, such as organic SH-containing compounds, such as 2-mercaptoethanol, 2-mercaptopropanol, mercaptoacetic acid, tert-butyl mercaptan, n-octyl mercaptan, n-dodecyl mercaptan and tert-dodecyl mercaptan, $C_1$ to $C_4$ aldehydes, such as formaldehyde, acetaldehyde, propionaldehyde, hydroxylammonium salts such as hydroxylammonium sulfate, formic acid, sodium bisulfite or hypophosphorous acid or the salts thereof, or isopropanol. The polymerization regulators are generally used in amounts of from 0.1 to 20% by weight, based on the monomers. The average molecular weight can also be influenced by the choice of appropriate solvent. For instance, polymerization in the presence of diluents containing benzylic hydrogen atoms, or in the presence of secondary alcohols such as isopropanol, for example, leads to a reduction in the average molecular weight, as a result of chain transfer.

Polymers of low molecular weight are also obtained by varying the temperature and/or the concentration of initiator.

In order to prepare higher molecular mass copolymers it is frequently advantageous to operate the polymerization in the presence of crosslinkers. Such crosslinkers are compounds having two or more ethylenically unsaturated groups, such as, for example, diacrylates or dimethacrylates of at least dihydric saturated alcohols, such as ethylene glycol diacrylate, ethylene glycol dimethacrylate, 1,2-propylene glycol diacrylate, 1,2-propylene glycol dimethacrylate, butane-1,4-diol diacrylate, butane-1,4-diol dimethacrylate, hexanediol diacrylate, hexanediol dimethacrylate, neopentyl glycol diacrylate, neopentyl glycol dimethacrylate, 3-methylpentanediol diacrylate and 3-methylpentanediol dimethacrylate. The acrylic and methacrylic esters of alcohols having more than 2 OH groups can also be used as crosslinkers, e.g., trimethylolpropane triacrylate or trimethylolpropane trimethacrylate. A further class of crosslinkers are diacrylates or dimethacrylates of polyethylene glycols or polypropylene glycols having molecular weights of from 200 to 9 000 in each case. Polyethylene glycols and polypropylene glycols used for preparing the diacrylates or dimethacrylates preferably have a molecular weight of from 400 to 2 000 in each case. As well as the homopolymers of ethylene oxide and/or propylene oxide it is also possible to use block copolymers of ethylene oxide and propylene oxide or copolymers of ethylene oxide and propylene oxide containing the ethylene and propylene oxide units in random distribution. The oligomers of ethylene oxide and/or propylene oxide are suitable as well for preparing the crosslinkers, e.g., diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Suitable crosslinkers further include vinyl acrylate, vinyl methacrylate, vinyl itaconate, divinyl adipate, butanediol divinyl ether, trimethylolpropane trivinyl ether, allyl acrylate, allyl methacrylate, pentaerythritol triallyl ether, triallylsucrose, pentaallylsucrose, pentaallylsaccharose, methylenebis (meth)acrylamide, divinylethyleneurea, divinylpropyleneurea, divinylbenzene, divinyldioxane, triallylcyanurate, tetraallylsilane, tetravinylsilane, and bis- or polyacryloylsiloxanes (e.g., Tegomers® from Th. Goldschmidt AG). The crosslinkers are used preferably in amounts of from 10 ppm to 5% by weight, based on the monomers to be polymerized.

If the method of emulsion, precipitation, suspension or dispersion polymerization is used, it can be advantageous to stabilize the polymer droplets or polymer particles by means of surface-active auxiliaries. Typically emulsifiers or protective colloids are used for this purpose. Suitable emulsifiers include anionic, nonionic, cationic, and amphoteric emulsifiers. Examples of anionic emulsifiers are alkylbenzenesulfonic acids, sulfonated fatty acids, sulfosuccinates, fatty alcohol sulfates, alkylphenol sulfates, and fatty alcohol ether sulfates. Examples of nonionic emulsifiers that can be used include alkylphenol ethoxylates, primary alcohol ethoxylates, fatty acid ethoxylates, alkanolamide ethoxylates, fatty amine ethoxylates, EO/PO block copolymers, and alkylpolyglucosides. Examples of cationic and amphoteric emulsifiers used include quaternized amine alkoxylates, alkylbetaines, alkylamidobetaines, and sulfobetaines.

Examples of typical protective colloids include cellulose derivatives, polyethylene glycol, polypropylene glycol, copolymers of ethylene glycol and propylene glycol, polyvinyl acetate, polyvinyl alcohol polyvinyl ethers, starch and starch derivatives, dextran, polyvinylpyrrolidone, polyvinylpyridine, polyethyleneimine, polyvinylimidazole, polyvinylsuccinimide, polyvinyl-2-methylsuccinimide, polyvinyl-1,3-oxazolid-2-one, polyvinyl-2-methylimidazoline, and maleic acid or maleic anhydride copolymers, as described in DE 2 501 123, for example.

The emulsifiers or protective colloids are customarily used in concentrations of from 0.05 to 20% by weight, based on the monomers.

If polymerization is carried out in aqueous solution or dilution then the monomers can be wholly or partly neutralized with bases prior to or during the polymerization. Examples of suitable bases include alkali metal and alkaline earth metal compounds such as sodium hydroxide, potassium hydroxide, calcium hydroxide, magnesium oxide, sodium carbonate; ammonia; primary, secondary, and tertiary amines, such as ethylamine, propylamine, monoisopropylamine, monobutylamine, hexylamine, ethanolamine, dimethylamine, diethylamine, di-n-propylamine, tributylamine, triethanolamine, dimethoxyethylamine, 2-ethoxyethylamine, 3-ethoxypropylamine, dimethylethanolamine, diisopropanolamine or morpholine.

Neutralization can also be effected using polybasic amines, such as ethylenediamine, 2-diethylaminoethylamine, 2,3-diaminopropane, 1,2-propylenediamine, dimethylaminopropylamine, neopentanediamine, hexamethylenediamine, 4,9-dioxadodecane-1,12-diamine, polyethyleneimine or polyvinylamine, for example.

For partial or complete neutralization of the ethylenically unsaturated carboxylic acids before or during the polymerization it is preferred to use ammonia, triethanolamine, and diethanolamine.

With particular preference the ethylenically unsaturated carboxylic acids are not neutralized prior to or during the polymerization. With preference neither is any neutralizing agent, apart from the alkanolamine B), added after the polymerization. The polymerization can be conducted continuously or batchwise in accordance with a multiplicity of variants. It is customary to introduce a fraction of the monomers as an initial charge, where appropriate in a suitable diluent or solvent and where appropriate in the presence of an emulsifier, protective colloid or further auxiliaries, to render the atmosphere inert, and to raise the temperature until the desired polymerization temperature is reached. However, the initial charge may also be a suitable diluent alone. The free-radical initiator, further monomers, and other auxiliaries, such as regulators or crosslinkers, for example, each in a diluent, if necessary, are metered in over a defined period of time. The feed times may differ in length. For example, the initiator feed may be run in over a longer time than that chosen for the monomer feed.

The polymers having a broad molecular weight distribution can also be prepared in situ in one step, by first synthesizing the low molecular mass fraction (at a defined initiator concentration/temperature) and, after adding 0-100% of the monomers, lowering the concentration of initiator in the reaction mixture and/or reducing the temperature (gradually or continuously); or the multimodal polymers can be prepared in situ in one step by first synthesizing the high molecular mass fraction (at defined initiator concentration/temperature) and, following the addition of 100-0% of the monomers, raising the initiator concentration in the reaction mixture and/or raising the temperature.

If the polymer is obtained in water in accordance with a solution polymerization process, there is usually no need to separate off the solvent. If it is nonetheless desired to isolate the polymer, this can be done by spray drying, for example.

If the polymer is prepared by a solution, precipitation or suspension polymerization method in a steam-volatile solvent or solvent mixture, the solvent can be removed by introducing steam in order thus to obtain an aqueous solution or dispersion. The polymer can also be separated from the organic diluent by a drying operation.

The polymers of A) and B) are preferably in the form of an aqueous dispersion or solution having solids contents of preferably from 10 to 80% by weight, in particular from 40 to 65% by weight.

Polymer A) can also be obtained by grafting maleic acid or maleic anhydride, or a monomer mixture comprising maleic acid or maleic anhydride, onto a graft base. Examples of suitable graft bases are monosaccharides, oligosaccharides, modified polysaccharides, and alkyl polyglycol ethers. Graft polymers of this kind are described in DE 4 003 172 and EP 116 930, for example.

The polyfunctional crosslinkers of component C) are, for example, alkanolamines having at least two OH groups. Preference is given to alkanolamines of the formula I

where $R^1$ is a hydrogen atom, a $C_1$-$C_{10}$ alkyl group or a $C_1$-$C_{10}$ hydroxyalkyl group and $R^2$ and $R^3$ are each a $C_1$-$C_{10}$ hydroxyalkyl group.

With particular preference $R^2$ and $R^3$ independently of one another are each a $C_2$-$C_5$ hydroxyalkyl group and $R^1$ is a hydrogen atom, a $C_1$-$C_5$ alkyl group or a $C_2$-$C_5$ hydroxyalkyl group.

Examples of compounds of the formula I include diethanolamine, triethanolamine, diisopropanolamine, triisopropanolamine, methyldiethanolamine, butyldiethanolamine, and methyldiisopropanolamine. Triethanolamine is particularly preferred.

Polyfunctional crosslinkers C) can also be difunctional or polyfunctional alcohols, such as glycerol, methylolated melamines or phenols, for example.

Further polyfunctional crosslinkers which can be used as component C) are described in EP 902 796, examples being trimethylolpropane, pentaerythritol, neopentyl glycol, glucose, sorbitol, hexanediol, lysine, and polyvinyl alcohol.

As component C) it is preferred to use alkanolamines, with particular preference triethanolamine.

For the preparation of the formaldehyde-free binders of the invention the polymer of A) and B) and component C) are preferably used in a ratio relative to one another such that the molar ratio of carboxyl groups of components A) and B) to the hydroxyl groups of component C) is from 20:1 to 1:1, more preferably from 8:1 to 5:1, and with particular preference from 5:1 to 1.7:1 (counting the anhydride groups here as 2 carboxyl groups).

The formaldehyde-free aqueous binders of the invention are prepared, for example, simply by adding component C) to the aqueous dispersion or solution of the polymers of A) and B).

The binders of the invention contain preferably less than 1.0% by weight, more preferably less than 0.5% by weight, and very preferably less than 0.3% by weight, in particular less than 0.1% by weight, based on the sum of A), B) and C), of a phosphorus-containing reaction accelerant. Phosphorus-containing reaction accelerants are referred to in EP 651 088 and EP 583 086, DE 196 21523, and EP 826 710. In particular they are alkali metal hypophosphites, alkali metal phosphites, alkali metal polyphosphates, alkali metal dihydrogenphosphates, polyphosphoric acid, hypophosphoric acid, phosphoric acid, alkylphosphinic acid or oligomers and polymers of these salts and acids.

The binders of the invention preferably contain no phosphorus-containing reaction accelerants, or no amounts of a phosphorus-containing compound that are effective for accelerating reaction. The binders of the invention may include an esterification catalyst, such as sulfuric acid or p-toluenesulfonic acid, for example. The binders of the invention can be used as impregnants or coatings. The binders of the invention may be the sole constituent of the impregnants or coatings. The impregnants or coatings may, however, also include further additives suitable for the particular use envisaged. Suitable examples include dyes, pigments, biocides, plasticizers, thickeners, adhesion promoters (e.g., alkoxysilanes, such as γ-aminopropyltriethoxysilane, Witco: Silquest A-1100 silane), reducing agents, and transesterification catalysts, or flame retardants (such as aluminum silicates, aluminum hydroxides, borates or phosphates), melamine/formaldehyde resins, dispersions (acrylates, styrene-butadiene dispersions), epoxy resins, polyurethane resins, emulsifiers (ionic, nonionic), hydrophobicizers (silicones) or retention agents.

The binders of the invention dry (at 50° C. in 72 hours) to form a film from 0.3 to 1 mm in thickness and following a subsequent 15-minute cure at 150° C. in air have a gel content of preferably more than 50% by weight, more preferably more than 60% by weight, very preferably more than 70% by weight, and in particular more than 75% by weight.

When cure is at an end the cured films are stored in water at 23° C. for 48 hours. Soluble fractions remain in the water. The film is then dried to constant weight at 50° C. and weighed. The weight corresponds to the gel content; the gel content is calculated in % by weight, based on the weight before the soluble fractions were separated off. Constant weight is reached when the weight decrease over a 3-hour period is less than 0.5%, in particular less than 0.1% by weight.

The binders of the invention are useful as binders for substrates, such as for producing moldings formed from fibers, chips or shavings, mats or boards, preferably for fibrous and particulate substrates. Examples of fiber webs include webs of cellulose, cellulose acetate, esters and ethers of cellulose, cotton, hemp, sisal, jute, flax, coconut fiber or banana fiber, cork, animal fibers, such as wool or hair, and especially webs of synthetic or inorganic fibers, e.g., aramid, carbon, polyacrylonitrile, polyester, mineral, PVC or glass fibers.

When used as binders for fiber webs the binders of the invention may include, for example, the following additives: silicates, silicones, boron compounds, lubricants, wetting agents.

Glass fiber webs are preferred. The unbonded fiber webs, particularly those of glass fibers, are bound, i.e., consolidated, by the binder of the invention.

For this purpose the binder of the invention is applied to the unbonded fiber web, by coating, spraying, impregnating and/or saturating, for example, in a fiber/polymer A (solids) weight ratio of from 25:1 to 1:1, more preferably from 20:1 to 3:1.

The binder of the invention is used here preferably in the form of a dilute aqueous preparation containing from 95% to 40% by weight of water.

After the binder of the invention has been applied to the unbonded fiber web it is generally dried at preferably from 100 to 400° C., in particular 130 to 280° C., very preferably 130 to 230° C., for a period of preferably from 10 seconds to 10 minutes, in particular from 10 seconds to 3 minutes.

The bonded fiber web obtained has a high strength in the dry and wet states. After drying, the bonded fiber web shows no yellowing, or virtually none. The binders of the invention allow in particular short drying times and also low drying temperatures.

The bonded fiber webs, especially glass fiber webs, are useful as or in roofing membranes, as backing materials for wallpapers or as inliners or backing material for floor coverings, for example those of PVC. PVC floor coverings manufactured using PVC plastisoles and glass fiber webs consolidated with the binders of the invention have little tendency to yellow.

When used as roofing membranes, the bonded fiber webs are generally coated with bitumen.

The binders of the invention can additionally be used as binders for insulating materials composed of the abovementioned fibers, particularly inorganic fibers such as mineral fibers and glass fibers.

The hitherto customary binders of the art, based on phenol-formaldehyde condensation resins, have the disadvantage that significant quantities of phenol, formaldehyde, and low molecular mass condensation products are emitted from them in vapor form during the preparation of the insulating materials. Great expense and effort is involved in restraining these environmentally hazardous substances. In addition, there may also be release of formaldehyde from the finished insulant products, which is undesirable particularly when they are used in residential buildings.

Fibers for insulating materials are produced in industry to a great extent by the spinning of melts of the corresponding raw mineral materials (see for example EP 567 480).

In the manufacture of insulating materials the aqueous binder solution is preferably sprayed onto the freshly prepared fibers while they are still hot. Most of the water evaporates, leaving the resin in an essentially uncured state as a viscous, high-solids material adhering to the fibers. The fibers are then used to produce binder-containing fiber mats, which are transported on through a curing oven by suitable conveyor belts. In the oven, the resin cures at oven temperatures of from about 150 to 350° C. After the curing oven, the insulant mats are finished in a suitable way, i.e., cut into a shape suitable for the end user.

The binders used in practice to produce insulating materials may include customary auxiliaries and additives. Examples of such are hydrophobicizers such as silicone oils, alkoxysilanes such as 3-aminopropyltriethoxysilane as coupling agent, soluble or emulsifiable oils as lubricants, and dust-binding agents, and also wetting assistants.

The predominant proportion of the mineral fibers or glass fibers used in the insulating materials have a diameter of between 0.5 and 20 µm and a length of between 0.5 and 10 cm.

Customary use forms of the insulating materials are rectangular or triangular insulant sheets and rolled-up webs. The thickness and density of the insulating materials can be varied within wide limits, allowing the production of products having the desired insulating effect. Customary thicknesses are between 1 and 20 cm, customary densities in the range between 5 and 300 kg/m$^3$. The insulating effect is characterized by the thermal conductivity lambda (in mW/m° K). The insulant sheets have a high dry and wet strength.

The binders of the invention are also suitable for manufacturing abrasive cloths, examples being pan cleaners or pan scourers based on bonded fiber webs. Suitable fibers include natural fibers and synthetic fibers (e.g., nylon). In the case of the pan cleaners and scourers the fiber webs are preferably consolidated in a spraying process.

The binders are additionally suitable for producing wood-base materials such as wood chipboard and wood fiberboard (cf. Ullmanns Encyclopadie der technischen Chemie, 4$^{th}$ edition, 1976, Volume 12, pp. 709-727), which can be manufactured by gluing disintegrated wood, such as wood chips and wood fibers, for example.

The water resistance of woodbase materials can be enhanced by adding to the binder a commercially customary aqueous paraffin dispersion or other hydrophobicizer, or adding these hydrophobicizers beforehand or afterward to the fibers, chips or shavings.

Chipboard production is common knowledge and is described in, for example, H. J. Deppe, K. Ernst Taschenbuch der Spanplattentechnik, $2^{nd}$ edition, Verlag Leinfelden 1982.

It is preferred to use chips whose average thickness is from 0.1 to 2 mm, in particular from 0.2 to 0.5 mm, and which contain less than 6% by weight of water. The binder is applied with great uniformity to the wood chips, the binder:wood chip weight ratio based on solids (calculated as A)+B)) being preferably from 0.02:1 to 0.3:1. Uniform distribution can be achieved by, for example, spraying the binder in finely divided form onto the chips.

The glued wood chips are then scattered out to form a layer with a highly uniform surface, the thickness of the layer being guided by the desired thickness of the finished chipboard. The scattered layer is pressed at a temperature of from 100 to 250° C., for example, preferably from 140 to 225° C., by applying pressures of usually from 10 to 750 bar, to form a dimensionally stable board. The press times required may vary within a wide range and are generally from 15 seconds to 30 minutes.

The wood fibers of appropriate quality required to produce medium-density fiber board (MDF) from the binders can be produced from barkless wood chips by milling in special mills or refiners at temperatures of about 180° C.

For gluing, the wood fibers are generally swirled up in a stream of air and the binder is introduced through nozzles into the resultant fiber stream (blow-line process). The ratio of wood fiber to binder based on the dry-matter content or solids content is usually from 40:1 to 3:1, preferably from 20:1 to 4:1. The glued fibers are dried in the fiber stream at temperatures, for example, of from 130 to 180° C., scattered out to form a fiber web, and pressed under pressures of from 20 to 40 bar to form boards or moldings.

Alternatively, as described for example in DE-A 2 417 243, the glued wood fibers can be processed to a transportable fiber mat. This intermediate can then be processed further to boards or shaped parts, such as door interior trim panels of motor vehicles, for example, in a second, temporally and spatially separate step.

The binders of the invention are additionally useful for producing plywood and carpentry board according to the commonly known manufacturing processes.

Other natural fiber materials as well, such as sisal, jute, hemp, flax, kenaf, coconut fibers, banana fibers and other natural fibers, can be processed with the binders to form boards and moldings. The natural fiber materials can also be used in mixtures with synthetic fibers, such as polypropylene, polyethylene, polyesters, polyamides or polyacrylonitrile. These synthetic fibers may in this case also function as cobinders alongside the binder of the invention. The fraction of the synthetic fibers is preferably less than 50% by weight, in particular less than 30% by weight, and very preferably less than 10% by weight, based on all shavings, chips or fibers. The fibers can be processed by the method employed for wood fiber board. Alternatively, preformed natural fiber mats can be impregnated with the binders of the invention, with the optional addition of a wetting assistant. The impregnated mats are then pressed, in the binder-moist or pre-dried state, at temperatures between 100 and 250° C. and pressures between 10 and 100 bar, for example, to form boards or shaped parts.

The moldings obtained in accordance with the invention feature low water absorption, little increase in thickness (swelling) after water storage, high strength, and absence of formaldehyde. They can be used in the automobile industry, for instance.

A further application of the binders of the invention is their use in the manufacture of abrasive materials, especially abrasive paper, abrasive cloth (woven or nonwoven) or other abrasive articles. In this context it can be advisable to adjust the aqueous polymer dispersions, prior to application to the paper or cloth in question or the corresponding article, to a pH of from 3 to 8, in particular from 3 to 5, by adding various organic or inorganic bases. Suitable bases include ammonia, organic monofunctional or polyfunctional amines, alkoxides, and metal alkyl compounds, but also inorganic bases such as sodium hydroxide or sodium carbonate, for example.

The likewise inventive abrasive materials obtainable in this way contain customary abrasive grit, based for example on corundum, quartz, garnet, pumice, tripel, silicon carbide, emery, aluminas, zironias, kieselguhr, sand, gypsum, boron carbide, borides, carbides, nitrides, cerium oxide or silicates.

Ways of producing the abrasive materials of the invention include the application first to the paper, cloth or article in question of the aqueous polymer solution, modified where appropriate with—for example—dispersions, followed by the addition of the abrasive grit selected and, finally, by the addition of further quantities of the aqueous polymer solution, again modified where appropriate with dispersions, for example, which is referred to as a size coat.

The inventive use of the aqueous polymer solution results in improved abrasive materials, featuring qualities including high flexibility, toughness/elasticity, tensile strength, and breaking extension, which have favorable abrasion behavior, and in which the abrasive grit is thoroughly bound.

A further inventive use of the binders is for producing filter materials, particularly filter papers or filter cloths. Examples of possible cloth materials include cellulose, cotton, polyesters, polyamide, PE, PP, glass webs, and glass wool. It can be advisable to adjust the aqueous polymer solutions to a pH of from 2 to 8, in particular from 3.0 to 6.5, before applying them to the corresponding paper or cloth, by addition of various organic or inorganic bases. Suitable bases include triethanolamine, diethanolamine, monoethanolamine, hydroxyalkylamines, ammonia, organic monofunctional or polyfunctional amines, alkoxides, and also metal alkyl compounds, and also inorganic bases such as sodium hydroxide or potassium hydroxide, for example. The adjustment of the pH to the stated range of values has the effect, among others, of reducing the drop in bursting strength following storage or thermal exposure and hence of achieving a high thermal stability.

Application of the polymer solution for inventive use to the filter materials, i.e., to filter paper or filter cloth, inter alia, is accomplished preferably by the impregnating method or by spraying. In these cases the aqueous polymer solutions are applied to the filter materials by resination. After the filter materials have been resinated with the aqueous polymer solutions they are heated, advisably, for from 0.1 to 60 minutes, in particular from 1 to 60 minutes, at temperatures from 100 to 250° C., in particular from 110 to 220° C., to cure them.

The inventive use of the aqueous polymer solution as a binder for filter materials means that the treated filter materials have, among other qualities, an enhanced mechanical stability (higher tensile strength and bursting strength), especially after storage under damp conditions and at elevated temperature. The inventive use of the aqueous binders also has the effect that the resultant filter materials are characterized by qualities including high chemical resistance, to solvents for example, without any effect on the permeability (pore size) of the filter material. Through the use of the aqueous polymer solutions it is also observed that they give the filter materials a high strength even after drying (dry tensile strength), and yet after drying below the curing temperature of the aqueous polymer solutions the filter materials can still be readily subjected to deformation by folding, grooving or pleating. Following subsequent thermal curing (heat treatment) the polymer solutions give the resultant and likewise inventive filter materials, primarily filter papers or filter cloths, a high dimensional stability. This quality makes it possible to produce intermediates and so to breakdown the manufacturing operation into individual, independent production steps.

A further inventive use of the aqueous polymer solutions is as binders for cork, cork webs, cork mats or cork board.

The examples below are intended to illustrate the invention, though without restricting it to them:

EXAMPLES

Preparation Procedures, General:

a) in situ:
   The polymers having a broad molecular weight distribution can be prepared in situ in one step by first synthesizing the low molecular mass fraction (at defined initiator concentration/temperature) and, after adding 0-100% of the monomers, lowering the initiator concentration in the reaction mixture and/or reducing the temperature (gradually or continuously); or the multimodal polymers can be prepared in situ in one step by first synthesizing the high molecular mass fraction (at defined initiator concentration/temperature) and, after adding 100-0% of the monomers, raising the initiator concentration in the reaction mixture and/or increasing the temperature.

b) Mixing:
   The polymers having a broad molecular weight distribution can be prepared by mixing polymers having different molecular weights.

c) Polymerizing one component in the presence of the other
   The polymers having a broad molecular weight distribution can be prepared by synthesizing one polymer of low or high molecular weight in the presence of a second polymer with high or low molecular weight respectively.

Methods of Analysis and Testing

Gel Permeation Chromatography

A combination of 4 separating columns (each of internal diameter 7.8 mm and length 30 cm, column temperature 35° C. in each case) with the following separation materials was used:

| Column No. | Separation material | Polyethylene oxide cut off |
|---|---|---|
| 1 | TSK G5000 PW xl | 4 000-1 000 000 |
| 2 | Waters Ultrahydrogel 1 000 | 1 000 000 |
| 3 | Waters Ultrahydrogel 500 | 400 000 |
| 4 | Waters Ultrahydrogel 500 | 400 000 |

The eluent used was 0.008 M TRIS buffer (tris(hydroxymethyl)aminomethane, Merck, Darmstadt) at a pH of 7 in distilled water, with the addition of 0.15 mol/L NaCl and 0.01 mol/L $NaN_3$.

400 µL of each sample solution were injected.

The flow rate was 0.5 mL/min. At this flow rate, the theoretical plate number for the separating column combination was 37 000.

The detector used was an ERC 7510 differential refractometer from ERMA.

Evaluation was ended after a volume of 39.6 mL (M(Na PAA) about 642) had passed through (integration limit). The chromatograms obtained were integrated in accordance with DIN 55672-1 with an accuracy of ±3%.

Dynamic Mechanical Measurements:

The measurements of the storage modulus G' took place with a deformation-controlled modular rheometer system from Rheometrics Inc., model ARES. A 2K FRTN1 type force transducer was used. Measurement setup: parallel plate geometry, plate diameter: 25 mm, sample thickness approx. 1 mm. The storage modulus G' was measured as a function of temperature, with the measurement frequency being 1 Hz and the heating rate 1° C./min.

Performance Tests:

Binder Formulation:

in each case 1% (based on solids) of Silquest A-1100

Base Web:

Glass web, approximately 50 $g/m^2$

Consolidation:

The base webs, 32 cm long and 28 cm wide, are guided lengthwise over a continuous PES screen belt first through a 20% binder liquor and subsequently via a suction apparatus. The belt speed is 0.6 m/min. The wet add-on is controlled by the adjustable strength of the suction. In the case of a wet add-on of approximately 100% the dry add-on, with a binder liquor concentration of 20%, is 20%+−2%.

The impregnated webs are cured at 200° C. for 2 minutes on a PES net support in a Mathis dryer (hot air is set at maximum).

Preparation of the Test Specimens:

5 test specimens for testing the tensile strength and 6 for testing the flexural rigidity in the longitudinal direction are cut from the web. The size of the webs is as follows:

for the tensile strength at 23° C. without further treatment ("tensile strength, RT") 240×50 mm for the tensile strength after storage for 15 minutes in hot water at 80° C. ("tensile strength, wet") 240×50 m for the flexural rigidity test 70×30 mm.

Tests:

a) Tensile strengths: the averaged test results are reported in N/5cm; the clamped length for the "dry" and "wet" tensile strength tests is 200 mm. The takeoff speed is set at 25 mm/min. The tensile strengths are corrected for weight to 60 $g/m^2$ (calculation formula: $F_{max}*60$ $[g/m^2]$/"actual weight" $[g/mg^2]$).

b) Flexural rigidity: the test strip is fixed in a clamping means and bent at an angle of 20° at a distance of 10 mm by way of a holder. The height of the test strip is 30 mm. The force measured represents the flexural rigidity. A total of 6 test specimens are measured, from the facing side and reverse side respectively, and a mean is determined.

EXAMPLES

| Example | $M_w$ [g/mol] | PD | Binder composition Composition | Other (based on polymer) |
|---|---|---|---|---|
| C1 (Comparative example 1) | 77 000 | 11.7 | AA/MA 75:25 wt %, SC: 46% + 30 wt % TEA based on polymer | |
| C2 (Comparative example 2) | 11 800 | 3.4 | AA/MA 70:30 wt %, SC: 46% + 30 wt % TEA based on polymer | |
| Polymer A | 3 500 | 2.6 | AA/MA 50:50 wt %, SC: 50% + 50 wt % TEA based on polymer | |
| Polymer B | 3 500 | 2.6 | AA/MA 50:50 wt %, SC: 50% + 30 wt % TEA based on polymer | |
| Example 1.1 | 22 700 | 12.8 | Mixture C1:Polymer A 25:75 wt % | |
| Example 1.2 | 34 700 | 15.8 | Mixture C1:Polymer A 50:50 wt % | |
| Example 1.2a | 34 700 | 15.8 | Mixture C1:Polymer A 50:50 wt % | 1 wt % hypophosphorous acid |
| Example 1.3 | 46 800 | 16.1 | Mixture C1:Polymer A 75:25 wt % | |
| Example 1.4 | 22 800 | 9.1 | Mixture C1:C2 25:75 wt % | |
| Example 1.5 | 38 200 | 10.9 | Mixture C1:C2 50:50 wt % | |
| Example 1.6 | 52 000 | 12.4 | Mixture C1:C2 75:25 wt % | |
| Example 1.7 | 22 700 | 12.8 | Mixture C1:Polymer B 25:75 wt % | |
| Example 1.8 | 33 100 | 8.9 | AA/MA 70:30 wt %, SC: 51% + 30 wt % TEA based on polymer | |
| Example 2.1 | 6 000 | 3.8 | Mixture C2:Polymer A 25:75 wt % | |
| Example 2.2 | 8 200 | 4.4 | Mixture C2:Polymer A 50:50 wt % | |
| Example 2.2a | 8 200 | 4.4 | Mixture C2:Polymer A 50:50 wt % | 1 wt % hypophosphorous acid |
| Example 2.3 | 10 000 | 4.8 | Mixture C2:Polymer A 75:25 wt % | |
| Example 2.4 | 7 100 | 8.1 | AA/MA 50:50 wt %, SC: 53% + 30 wt % TEA based on polymer | |

AA: Acrylic acid, MA: Maleic acid, TEA: Triethanolamine
$M_w$: Weight-average molecular weight, PD: Polydispersity ($M_w/M_n$), SC: Solids content
All examples are in the form of aqueous solutions

Example 1.8

A pressure reactor with stirrer, nitrogen supply and metering means was charged with 1 275 g of distilled water, 560 g of maleic anhydride, and 4.6 mg of iron sulfate hepta-hydrate, injected with nitrogen and then evacuated, this procedure being carried out 3 times, and subsequently heated to an internal temperature of 100° C. Then a mixture of 1 547 g of acrylic acid and 473 g of distilled water, added over 5 h, and 516 g of 30% strength hydrogen peroxide solution, over 6 h, were added in two separate feeds (see metering program).

Temperature Program (Starting with Commencement of the Feeds):

1 h at 100° C., heating to 130° C. over 4 h, 3 h at 130° C.

Hydrogen Peroxide Feed:

1st h: 21 g, 2nd h: 30 g, 3rd h: 51 g, 4th h: 89 g, 5th h: 137 g, 6th h: 185 g

This gave a yellowish, clear solution having a K value (5% strength in water) of 19.4 and an average molecular weight $M_w$ of 33 100 g/mol, PD: 8.9 (solids content of the solution: 50.5% by weight).

The product was subsequently blended with 30% of triethanolamine, based on solids content.

Example 2.4

A pressure reactor with stirrer, nitrogen supply and metering means was charged with 855 g of distilled water, 923 g of maleic anhydride, and 4.6 mg of iron sulfate heptahydrate, injected with nitrogen and then evacuated, this procedure being carried out 3 times, and subsequently heated to an internal temperature of 130° C. Then a mixture of 1 118 g of acrylic acid and 789 g of distilled water, added over 5 h, and 516 g of 30% strength hydrogen peroxide solution, over 6 h, were added in two separate feeds (see metering program).

Temperature Program (Starting with Commencement of the Feeds):

1 h at 130° C., cooling to 1 00° C. over 4 h, 3 h at 1 00° C.

Hydrogen Peroxide Feed:

1st h: 182 g, 2nd h: 137 g, 3rd h: 86 g, 4th h: 50 g, 5th h: 30 g, 6th h: 20.5 g

This gave a yellowish, clear solution having a K value (5% strength in water) of 12.0 and an average molecular weight $M_w$ of 7 100 g/mol, PD: 8.1 (solids content of the solution: 52.2% by weight).

The product was subsequently blended with 30% of triethanolamine, based on solids content.

TABLE 1

| Example | $M_w$ [g/mol] | PD | Tensile strength, RT [N/5 cm] | Tensile strength, wet [N/5 cm] | Flexural rigidity [mN] | G' (50° C.)/G'$_{min}$ | Increase in fluidity in % | Temperature at G'$_{min}$ [° C.] |
|---|---|---|---|---|---|---|---|---|
| C1 | 77 000 | 11.7 | 148 | 136 | 240 | 2 | =100 | 100 |
| Example 1.1 | 22 700 | 12.8 | 143 | 137 | 235 | 50 | 2500 | 115 |
| Example 1.2 | 34 700 | 15.8 | 153 | 145 | 244 | 8 | 400 | 95 |
| Example 1.2a | 34 700 | 15.8 | 152 | 143 | 240 | 7 | 350 | 95 |
| Example 1.3 | 46 800 | 16.1 | 152 | 145 | 327 | 3 | 150 | 100 |
| Example 1.4 | 22 800 | 9.1 | 153 | 138 | 241 | 6 | 300 | 100 |
| Example 1.5 | 38 200 | 10.9 | 149 | 138 | 281 | 5 | 250 | 95 |
| Example 1.6 | 52 000 | 12.4 | 155 | 149 | 286 | 3 | 150 | 95 |
| Example 1.7 | 22 700 | 12.8 | 148 | 137 | 268 | 8 | 400 | 100 |
| Example 1.8 | 33 100 | 8.9 | 149 | 138 | 245 | 3 | 150 | 95 |

$M_w$: weight-average molecular weight, PD: polydispersity ($M_w/M_n$)
G': storage modulus, G'$_{min}$: storage modulus at minimum point on curve

TABLE 2

| Example | $M_w$ [g/mol] | PD | Tensile strength, RT [N/5 cm] | Tensile strength, 180° C. [N/5 cm] | Tensile strength, wet [N/5 cm] | G' (50° C.)/G'$_{min}$ | Increase in fluidity in % | Temperature at G'$_{min}$ [° C.] |
|---|---|---|---|---|---|---|---|---|
| C2 | 11 800 | 3.4 | 144 | 115 | 141 | 5 | =100 | 100 |
| Example 2.1 | 6 000 | 3.8 | 145 | 116 | 131 | 5500 | 1000 | 110 |
| Example 2.2 | 8 200 | 4.4 | 149 | 122 | 142 | 820 | 400 | 110 |
| Example 2.2a | 8 200 | 4.4 | 147 | 120 | 141 | 720 | 400 | 110 |
| Example 2.3 | 10 000 | 4.8 | 151 | 117 | 143 | n.d. | n.d. | n.d. |
| Example 2.4 | 7 100 | 8.1 | 145 | 117 | n.d. | 20 | 400 | 110 |

$M_w$: weight-average molecular weight, PD: polydispersity ($M_w/M_n$)
G': storage modulus, G'$_{min}$: storage modulus at minimum point on curve

We claim:

1. A formaldehyde-free aqueous binder having a broad molecular weight distribution and comprising a mixture of polymers composed of monomers A) and B), comprising
   (A) from 5 to 50% by weight of an ethylenically unsaturated acid anhydride or ethylenically unsaturated dicarboxylic acid whose carboxylic acid groups can form an anhydride group, or mixtures thereof [monomers A)],
   (B) from 50 to 95% by weight of at least one ethylenically unsaturated compound different from monomers A) [monomers B)], and
   (C) at least one polyfunctional crosslinker or mixtures thereof,
   the polymers of monomers A) and B) obtained by free-radical addition polymerization, when classified in a coordinate system by way of their average molecular weight Mw and their polydispersity, being situated in the area above a straight line which is defined by the linear equation y=1.25x+20 000 and has been shifted in y direction parallelwise by at least +3 000, the x axis denoting the weight-average molecular weight and the y axis the polydispersity times 10 000, wherein the polymers are prepared:
   (a) in situ in one step by first synthesizing either a low molecular mass fraction at a particular initiator concentration and temperature and then, after lowering the initiator concentration in the reaction mixture and/or reducing the temperature, synthesizing a high molecular mass fraction, or by first synthesizing a high molecular mass fraction at a particular initiator concentration and temperature and then, after raising the initiator concentration in the reaction mixture and/or increasing the temperature, synthesizing a low molecular mass fraction,
   (b) by mixing polymers having different molecular weights, or
   (c) by synthesizing one polymer of low or high molecular weight in the presence of a second polymer with high or low molecular weight, respectively.

2. The formaldehyde-free aqueous binder according to claim 1, wherein the aqueous binder comprises less than 1.5% by weight, based on the sum of A), B) and C), of a phosphorus-comprising reaction accelerant.

3. The formaldehyde-free aqueous binder according to claim 1, wherein the polymer of A) and B) comprises from 5 to 50% by weight of maleic acid.

4. The formaldehyde-free aqueous binder according to claim 3, wherein the polymer of A) and B) comprises acrylic acid and maleic acid.

5. The formaldehyde-free aqueous binder according to claim 1, wherein the at least one polyfunctional crosslinker C) is a compound of the formula I

where $R^1$ is hydrogen, $C_1$-$C_{10}$ alkyl or $C_1$-$C_{10}$ hydroxyalkyl and $R^2$ and $R^3$ are each $C_1$-$C_{10}$ hydroxyalkyl.

6. The formaldehyde-free aqueous binder according to claim 1, wherein the at least one polyfunctional crosslinker C) is triethanolamine.

7. A method for binding an article comprising applying the formaldehyde-free aqueous binder as claimed in claim 1 to the article.

8. The method as claimed in claim 7, wherein the article is at least one selected from the group consisting of fiber, a fiber mat, a fiber web, glass fiber, a glass fiber web, a glass fiber mat, a mineral fiber, a mineral fiber web and a mineral fiber mat.

9. A process for producing a bonded fiber web, comprising coating, spraying or impregnating the fiber web with the formaldehyde-free aqueous binder as claimed in claim 1 and subsequently drying the fiber web.

10. The process according to claim 9 for producing bonded glass fiber webs or mats.

11. A bonded fiber web or mat obtained by the method as claimed in claim 8.

12. A bonded glass fiber web or mat obtained by the method as claimed in claim 8.

13. A roofing membrane comprising the bonded fiber web or mat as claimed in claim 11.

14. A roofing membrane comprising the bonded glass fiber web or mat as claimed in claim 12.

15. An insulating material comprising the bonded fiber web or mat as claimed in claim 11.

16. A floor covering comprising the bonded fiber web or mat as claimed in claim 11.

17. An insulating material comprising the bonded glass fiber web or mat as claimed in claim 12.

18. A floor covering comprising the bonded glass fiber web or mat as claimed in claim 12.

19. A method for producing a molding comprising combining the formaldehyde-free aqueous binder as claimed in claim 1 with fibers, chips or shavings.

20. The method as claimed in claim 19, wherein the fibers, chips or shavings are composed of renewable raw materials.

21. The method as claimed in claim 19, wherein the fibers are natural or synthetic fibers or mixtures thereof.

22. The method as claimed in claim 19, wherein the substrates are wood fibers, wood chips, jute, sisal, flax, hemp or kenaf.

23. The method as claimed in claim 19, wherein the substrates are wood chipboard panels.

24. A filter material comprising the formaldehyde-free aqueous binder as claimed in claim 1 and a filter medium.

25. An abrasive comprising the formaldehyde-free aqueous binder as claimed in claim 1 and an abrasive material.

26. A cork product comprising the formaldehyde-free aqueous binder as claimed in claim 1 and cork.

27. The formaldehyde-free aqueous binder according to claim 1, wherein the polymers are prepared in situ in one step by first synthesizing either a low molecular mass fraction at a particular initiator concentration and temperature and then, after lowering the initiator concentration in the reaction mixture and/or reducing the temperature, synthesizing a high molecular mass fraction, or first synthesizing a high molecular mass fraction at a particular initiator concentration and temperature and then, after raising the initiator concentration in the reaction mixture and/or increasing the temperature, synthesizing a low molecular mass fraction.

28. The formaldehyde-free aqueous binder according to claim 1, wherein the polymers are prepared by mixing polymers having different molecular weights.

29. The formaldehyde-free aqueous binder according to claim 1, wherein the polymers are prepared by synthesizing one polymer of low or high molecular weight in the presence of a second polymer with high or low molecular weight, respectively.

* * * * *